(12) United States Patent
Jones et al.

(10) Patent No.: US 7,792,143 B1
(45) Date of Patent: Sep. 7, 2010

(54) METHOD AND APPARATUS FOR INTERWORKING DISSIMILAR TEXT PHONE PROTOCOLS OVER A PACKET SWITCHED NETWORK

(75) Inventors: Paul Edwin Jones, Apex, NC (US); Rajesh Kumar, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1372 days.

(21) Appl. No.: 11/090,476

(22) Filed: Mar. 25, 2005

(51) Int. Cl.
*H04J 3/16* (2006.01)
(52) U.S. Cl. .................................. 370/466; 370/467
(58) Field of Classification Search ................ 370/261, 370/352, 401, 466, 252, 342, 400, 402, 403, 370/404, 449, 473, 270; 379/93.01, 52, 88.13, 379/93.31, 93.33, 93.14, 93.08, 93.17, 229, 379/230; 709/227, 228, 229; 455/450, 458, 455/519, 466
See application file for complete search history.

(56) References Cited

U.S. PATENT DOCUMENTS

| | | | |
|---|---|---|---|
| 4,506,358 A | 3/1985 | Montgomery | |
| 4,991,169 A | 2/1991 | Davis et al. | |
| 5,121,385 A | 6/1992 | Tominaga et al. | |
| 5,157,759 A * | 10/1992 | Bachenko | 704/266 |
| 5,195,000 A | 3/1993 | Suzuki | |
| 5,282,244 A | 1/1994 | Fuller et al. | |
| 5,384,840 A | 1/1995 | Blatchford et al. | |
| 5,521,960 A * | 5/1996 | Aronow | 379/52 |
| 5,680,443 A * | 10/1997 | Kasday et al. | 379/88.13 |
| 5,694,548 A | 12/1997 | Baugher et al. | |
| 5,757,895 A | 5/1998 | Aridas et al. | |
| 5,762,376 A | 6/1998 | Taskett | |
| 5,799,317 A | 8/1998 | He et al. | |
| 5,802,362 A | 9/1998 | Lipp et al. | |
| 5,822,420 A | 10/1998 | Bolon et al. | |
| 5,848,069 A | 12/1998 | Milne et al. | |
| 5,905,476 A * | 5/1999 | McLaughlin et al. | 715/781 |
| 5,915,000 A | 6/1999 | Nguyen et al. | |
| 6,052,458 A | 4/2000 | Amir-Ebrahimi | |
| 6,081,591 A | 6/2000 | Skoog | |
| 6,175,573 B1 | 1/2001 | Togo et al. | |
| 6,188,760 B1 * | 2/2001 | Oran et al. | 379/230 |
| 6,225,944 B1 | 5/2001 | Hayes | |
| 6,233,253 B1 | 5/2001 | Settle et al. | |
| 6,236,672 B1 | 5/2001 | Hiramatsu | |
| 6,266,343 B1 | 7/2001 | Caves | |
| 6,345,251 B1 | 2/2002 | Jansson et al. | |
| 6,351,471 B1 | 2/2002 | Robinett et al. | |

(Continued)

OTHER PUBLICATIONS

Hellstrom, G., "RTP Payload for Text Conversion", IETF RFC 2793, May 2000.

(Continued)

*Primary Examiner*—Aung S Moe
*Assistant Examiner*—Abdullah Riyami
(74) *Attorney, Agent, or Firm*—Stolowitz Ford Cowger LLP

(57) ABSTRACT

A communication scheme allows two Voice Over Internet Protocol (VoIP) gateways that do not necessarily support a common set of Public Switched Telephone Network (PSTN) text terminal (TTY) modulations and which are communicating with dissimilar PSTN text terminal devices to negotiate a transition to text relay mode thus allowing those dissimilar PSTN text terminal devices to interwork with each other.

31 Claims, 5 Drawing Sheets

U.S. PATENT DOCUMENTS

| | | | |
|---|---|---|---|
| 6,351,495 B1 | 2/2002 | Tarraf | |
| 6,393,000 B1 | 5/2002 | Feldman | |
| 6,411,705 B2* | 6/2002 | Oran et al. | 379/230 |
| 6,421,425 B1 | 7/2002 | Bossi et al. | |
| 6,438,137 B1 | 8/2002 | Turner et al. | |
| 6,477,176 B1 | 11/2002 | Hamalainen et al. | |
| 6,490,286 B1 | 12/2002 | Ono et al. | |
| 6,501,779 B1 | 12/2002 | McLaughlin et al. | |
| 6,535,594 B1 | 3/2003 | Reeves-Nobles et al. | |
| 6,545,616 B1 | 4/2003 | Haimi-Cohen | |
| 6,546,082 B1 | 4/2003 | Alcendor et al. | |
| 6,570,966 B1* | 5/2003 | Freeman et al. | 379/93.08 |
| 6,574,191 B1 | 6/2003 | Usukura et al. | |
| 6,584,070 B1 | 6/2003 | Takashima et al. | |
| 6,594,267 B1 | 7/2003 | Dempo | |
| 6,603,739 B1 | 8/2003 | Dubuc | |
| 6,611,804 B1 | 8/2003 | Dorbecker et al. | |
| 6,614,808 B1 | 9/2003 | Gopalakrishna | |
| 6,621,514 B1 | 9/2003 | Hamilton | |
| 6,621,821 B1 | 9/2003 | Song | |
| 6,628,967 B1 | 9/2003 | Yue | |
| 6,639,916 B1 | 10/2003 | Wakizaka | |
| 6,668,043 B2* | 12/2003 | Hyziak et al. | 379/52 |
| 6,694,007 B2* | 2/2004 | Lang et al. | 379/222 |
| 6,707,821 B1 | 3/2004 | Shaffer et al. | |
| 6,721,334 B1 | 4/2004 | Ketcham | |
| 6,735,190 B1 | 5/2004 | Chuah et al. | |
| 6,757,732 B1 | 6/2004 | Sollee et al. | |
| 6,829,254 B1 | 12/2004 | Rajahalme et al. | |
| 6,904,058 B2 | 6/2005 | He et al. | |
| 6,961,320 B1 | 11/2005 | Swaminathan et al. | |
| 7,007,235 B1 | 2/2006 | Hussein et al. | |
| 7,065,185 B1* | 6/2006 | Koch | 379/88.14 |
| 7,088,710 B1 | 8/2006 | Johnson et al. | |
| 7,170,976 B1 | 1/2007 | Keagy | |
| 7,174,004 B1* | 2/2007 | Michaelis | 379/52 |
| 7,187,697 B1 | 3/2007 | Aviely et al. | |
| 7,193,973 B2 | 3/2007 | Nagai et al. | |
| 7,359,370 B1* | 4/2008 | Renkel et al. | 370/352 |
| 7,379,431 B2 | 5/2008 | Michaelis | |
| 7,391,784 B1* | 6/2008 | Renkel | 370/401 |
| 2002/0021700 A1 | 2/2002 | Hata et al. | |
| 2002/0164002 A1* | 11/2002 | Beadle et al. | 379/93.01 |
| 2003/0096626 A1* | 5/2003 | Sabo et al. | 455/466 |
| 2003/0119518 A1 | 6/2003 | Cleveland et al. | |
| 2003/0125952 A1* | 7/2003 | Engelke et al. | 704/260 |
| 2003/0158957 A1 | 8/2003 | Abdolsalehi | |
| 2003/0198226 A1 | 10/2003 | Westberg | |
| 2003/0198320 A1* | 10/2003 | Engelke et al. | 379/52 |
| 2004/0008667 A1 | 1/2004 | Michaelis | |
| 2004/0127233 A1* | 7/2004 | Harris et al. | 455/458 |
| 2004/0198323 A1 | 10/2004 | Himanen et al. | |
| 2004/0228325 A1* | 11/2004 | Hepworth et al. | 370/352 |
| 2005/0002525 A1 | 1/2005 | Alkove et al. | |
| 2005/0021826 A1* | 1/2005 | Kumar | 709/232 |
| 2005/0086699 A1* | 4/2005 | Hahn et al. | 725/106 |
| 2005/0114145 A1* | 5/2005 | Janakiraman et al. | 704/277 |
| 2005/0144247 A1 | 6/2005 | Christensen et al. | |
| 2005/0190756 A1 | 9/2005 | Mundra et al. | |
| 2005/0190893 A1* | 9/2005 | Stephens et al. | 379/52 |
| 2005/0195801 A1* | 9/2005 | Chu et al. | 370/352 |
| 2005/0232169 A1* | 10/2005 | McLaughlin et al. | 370/261 |
| 2005/0254635 A1* | 11/2005 | Koretsky et al. | 379/142.08 |
| 2006/0007916 A1* | 1/2006 | Jones et al. | 370/352 |
| 2006/0018307 A1 | 1/2006 | Michalewicz et al. | |
| 2006/0058049 A1* | 3/2006 | McLaughlin et al. | 455/466 |
| 2006/0098792 A1* | 5/2006 | Frank et al. | 379/70 |
| 2006/0109783 A1 | 5/2006 | Schoeneberger et al. | |
| 2006/0114350 A1* | 6/2006 | Shimada et al. | 348/423.1 |
| 2007/0064090 A1* | 3/2007 | Park et al. | 348/14.01 |
| 2007/0127643 A1* | 6/2007 | Keagy | 379/88.13 |

OTHER PUBLICATIONS

Schulzrinne, H. et al., "RTP Payload for DTMF Digits, Telephony Tones and Telephony Signals", RFC 2833, May 2000.

Authors unknown, TIA Standard, "Transport of TIA-825-A Signals over IP Networks" (Draft), PN-3-0098 (TIA-1001), 2004.

Hellstrom, G. et al., "RTP Payload for Text Conversion interleaved in an audio stream", IETF-AVT-AUDIO tI40c, Aug. 2004.

Hellstrom, G. et al., "RTP Payload for Text Conversion", IETF RFC 4103, Jun. 2005.

G. Hellstrom and P. Jones, "RTP Payload for Text Conversation," Aug. 2004, pp. 1-25.

H. Schulzrinne, "RTP Payload for DTMF Digits, Telephony Tones and Telephony Signals," May 2000, pp. 1-27.

H. Schulzrinne, S. Casner, R. Frederick, V. Jacobson, "RTP: A Transport Protocol for Real-Time Applications," RFC 1889, Jan. 1996, pp. 1, 8, 11 and 13, RFC Editor.

H. Schulzrinne, S. Casner, R. Frederick, V. Jacobson, "RTP: A Transport Protocol for Real-Time Applications," RFC 3550, Jul. 2003, pp. 1, 8-10, 13, 16-17, RFC Editor.

ITU-T, "Text conversation and TextSET," Annex G, rev. Jul. 2003, pp. 196-202, International Telecommunication Union-Telecommunication Standardization Sector.

J. Rosenberg, H. Schulzrinne, "An Answer/Offer Model with Session Description Protocol (SDP)", RFC 3264, Jun. 2002, pp. 1-14 and 19-20, RFC Editor.

J. Rosenberg, H. Schulzrinne, G. Camarillo, A. Johnston, J. Peterson, R. Sparks, M. Handley, E. Schooler, "SIP: Session Initiation Protocol," RFC 3261, Jun. 2002, pp. 1, 8, 24, 26-29, 78-80 and 206, RFC Editor.

S. Bradner, "Intellectual Property Rights in IETF Technology," Feb. 2004, pp. 1-15.

S. Casner, V. Jacobson, "Compressing IP/UDP/RTP Headers for Low-Speed Serial Links," RFC 2508, Feb. 1999, pp. 1 and 4, RFC Editor.

ANSI/TIA-825-A (2003), A Frequency Shift Keyed Modem for use on the Public Switched Telephone Network.

ITU V.18, 112000, Operational and interworking requirements for DCEs operating in the text telephone mode.

ITU T.140, Protocol for Multimedia Application Text Conversation.

Section 508 of the U.S. Rehabilitation Act of 1973, http://www.section508.gov.

ITU V.150.0, Modem over IP Networks—A Foundation.

ITU V.150.1, Procedures for the End-to-End connection of V-series DCEs over an IP Network.

International reference alphabet (IRA): Information Technology—7-bit coded character set for information exchange.

ITU Y.1541, Network performance objectives for IP-based services.

RFC 2733, An RTP Payload Format for Generic Forward Error Correction.

IETF RFC 3407, Session Description Protocol (SDP) Simple Capability Declaration, Oct. 2002.

ITU-T Recommendation H.460.6 (2002), Extended Fast Connect.

ITU-T SG16QH-03001, Text over IP Requirements Specification.

ITU-T Recommendation H.323 (2000), Packet-based multimedia communications systems.

ITU-T Recommendation H.245 (2002), Control Protocol for Multimedia Communication.

ITU-T Recommendation F.700 Annex A.3 (2000), Multimedia framework, media descriptions.

ITU-T Recommendation F.703 (2000), Multimedia Conversational Service description.

QH16-03015, Study Group 16—Question H, Text over IP requirements specification—version 1.1.

http://www.tmcnet.com/articles/itmag/2ndQuarter/centerstage001.htm, "Internet Telephony Center Stage: Second Quarter 1998," 4 pages.

http://www.intel.com/network/csp/products/3940web.htm, "Intel Telecom Products: DM IP Series Release 5.1," 7 pages.

International Search Report for PCT/US05/20789; International Searching Authority/US; Jul. 2006.
International Preliminary Report on Patentablility and Written Opinion of the International Search Authority for PCT/US05/20789; International Searching Authority/US; Jul. 2006.

Stolowitz Ford Cowger LLP, Listing of Related Cases, Jul. 7, 2009.
Stolowitz Ford Cowger LLP, Listing of Related Cases, Jan. 14, 2010.

* cited by examiner

METHOD AND APPARATUS FOR INTERWORKING DISSIMILAR TEXT PHONE PROTOCOLS OVER A PACKET SWITCHED NETWORK

BACKGROUND

Transport of Public Switched Telephone Network (PSTN) text phone (TTY) signals over packet switched networks is a relatively new concept and one studied only recently within various standards bodies. The International Telecommunication Union (ITU) and Telecommunications Industry Association (TIA) are working on International and United States (US) standards, respectively, to facilitate the transport of text phone signals received by a Voice Over Internet Protocol (VoIP) gateway from a PSTN text phone over an Internet Protocol (IP) network within the context of a "VoIP call".

New TIA 1001 and ITU V.151 standards, and text relay protocol (RFC 2793), describe how to transport text over IP networks. Initial proposals required that every PSTN text phone be supported by every gateway, which is expensive and will take years to realize. Alternative proposals recommend using only a subset of text phone protocols, allowing only like TTY devices to communicate as they do today over the PSTN. There is a desire for the gateways to provide interworking functionality between dissimilar TTY types through gateways connected to the PSTN.

The Text Relay (TR) protocol requires both IP endpoints to negotiate a text relay media capability. The IP endpoint detecting a text terminal call has to elect to use the TR protocol in response to specific stimulus from the text phone signal. This TR decision is based on IP endpoint call discrimination procedures. Unlike an audio media format where TTY signals are carried as audio signals, the text relay media format cannot be used unless a device knows that the remote device can properly deliver the text information received to the user. Thus, the text relay capability is normally confined to media gateways connected to like TTY devices on each end and to IP phones with RFC 2793 text capabilities.

Problems arise trying to provide interworking between dissimilar PSTN text phone modulations. A gateway cannot simply shift to text relay without also potentially sacrificing interoperability between like PSTN text phone devices. For example, a gateway in the United Kingdom (UK) may only support an ITU V.21 text modulation and a gateway in the United States (US) may only support Baudot modulation.

A caller in the UK could call the US and the UK gateway may then propose a shift from the audio mode to the text relay mode. The caller in the UK could then start sending text packets to the gateway in the US when the called party in the US is actually using a V.21 text terminal. This would preclude the users from communicating since the US gateway cannot convert the text in the text relay mode packets back into PSTN V.21 modulation tones.

The present invention addresses this and other problems associated with the prior art.

SUMMARY OF THE INVENTION

A communication scheme allows two Voice Over Internet Protocol (VoIP) devices that do not necessarily support a common set of Public Switched Telephone Network (PSTN) text terminal (TTY) modulations and which also may be communicating with dissimilar PSTN text terminal devices to negotiate a transition to text relay mode thus allowing those dissimilar PSTN text terminal devices to interwork with each other.

The foregoing and other objects, features and advantages of the invention will become more readily apparent from the following detailed description of a preferred embodiment of the invention which proceeds with reference to the accompanying drawings.

DETAILED DESCRIPTION

Figure 1:
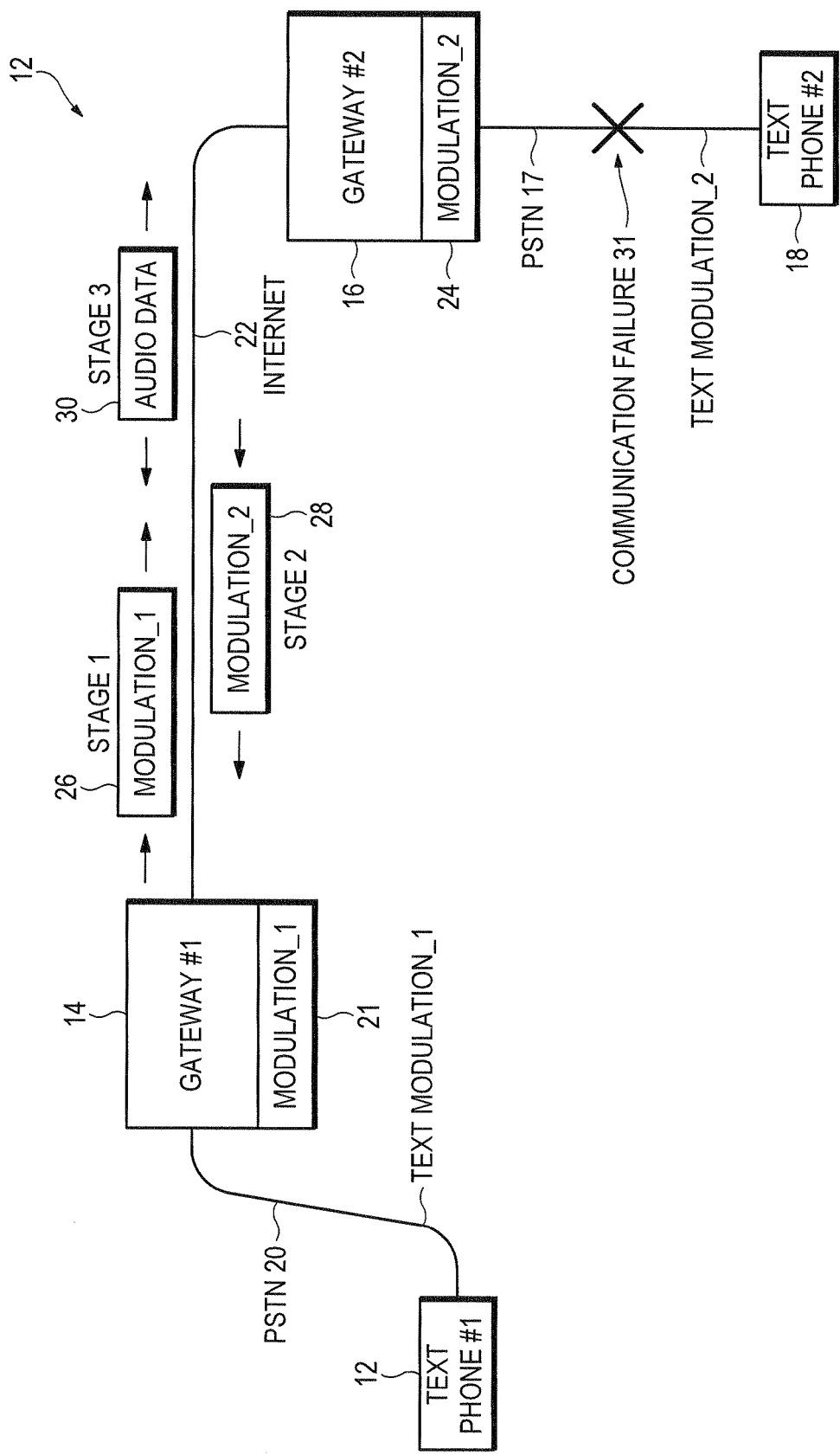
FIG. 1 is a block diagram showing a network with disparate text terminals.

FIG. 1 shows examples of the problems involved with supporting text calls over a packet switched network when the Text Terminals (TTY) have dissimilar PSTN modulation schemes. A Public Switch Telephone Network (PSTN) 20 includes a text terminal 12 that is connected to a gateway 14. Another text terminal 18 is connected to a gateway 16 through a PSTN 17. The two gateways 14 and 16 are connected to each other through a packet switched network 22 that is referred to generally as the Internet. The text terminals 12 and 18 are alternatively referred to as text phones (TTYs) and can be any type of device used for sending modulation signals that represent text characters. Common examples include Baudot devices and ITU V.21 devices. It should be understood that the gateways 14 and 16 could be any type of network processing device that allows signals from the PSTN network to be communicated over a packet switched network. For example, analog terminal adapters could alternatively be used.

In this example, the first text phone 12 uses a first PSTN modulation_1 for transmitting text data over the PSTN network 20 to the gateway 14. Gateway 14 is shown having a modem 21 that supports modulation_1. The second text phone 18 uses a second PSTN modulation_2 for transmitting text data over the PSTN network 17 to the gateway 16. Gateway 16 is shown having a modem 24 that supports modulation_2. In one example, modulation_1 may be Baudot signals and modulation_2 may be ITU V.21 signals. But of course, this is just one example.

The text phone 12 initiates a call to text phone 18. In this example, gateway 14 sends information 26 identifying modulation_1 among any other supported modulations. In a second signaling stage, information 28 is sent back to gateway 14 identifying the modulations supported by gateway 16. Information 26 and 28 may be exchanged in any order or in parallel. In this example, information 28 identifies modulation_2. Because the two gateways 14 and 16 do not support the same PSTN text modulation, in a third optional stage, an audio mode 30 is established over the packet network 22.

In general, during the audio mode 30, the gateways 14 and 16 simply forward the same PSTN modulation tones generated by text phones 12 and 18, respectively, over the packet switched network 22. For example, during the audio mode 30 packets may be transferred that contain TTY, fax, and modem signals.

The gateways 14 and 16 may add additional features onto the PSTN modulation signals, such as adding redundancy or forward error correction. But, the PSTN modulated tones from text phones 12 and 18 are not encoded or translated by the gateways 14 and 16 into text equivalents. One example of an audio mode is described in ITU V.152 which is herein incorporated by reference. Of course other types of audio modes can also be used.

During the audio mode 30, gateway 16 receives packets from gateway 14 containing the modulation_1 tones. Text phone 18 does not use PSTN modulation_1, but instead uses PSTN modulation_2. As a result of the modulation incompatibility, a communication failure 31 results and the two text phones 12 and 18 do not establish a text phone call.

In another example, both gateway 14 and gateway 16 might operate in a text relay mode. In this arrangement, gateway 14 would translate the PSTN modulation_1 tones into text that is then packetized and sent to gateway 16. The problem with this scenario is that gateway 16 can only translate the text in the transmitted packets into modulation_2 tones. Unfortunately, the text phone 18 may not operate using PSTN modulation_2 but alternatively might operate using modulation_1. This would cause another communication failure 31 between text phones 12 and 18. Thus, operating in the text relay mode could prevent a successful text phone call that might have otherwise been successfully established using the audio mode 30.

Figure 2:
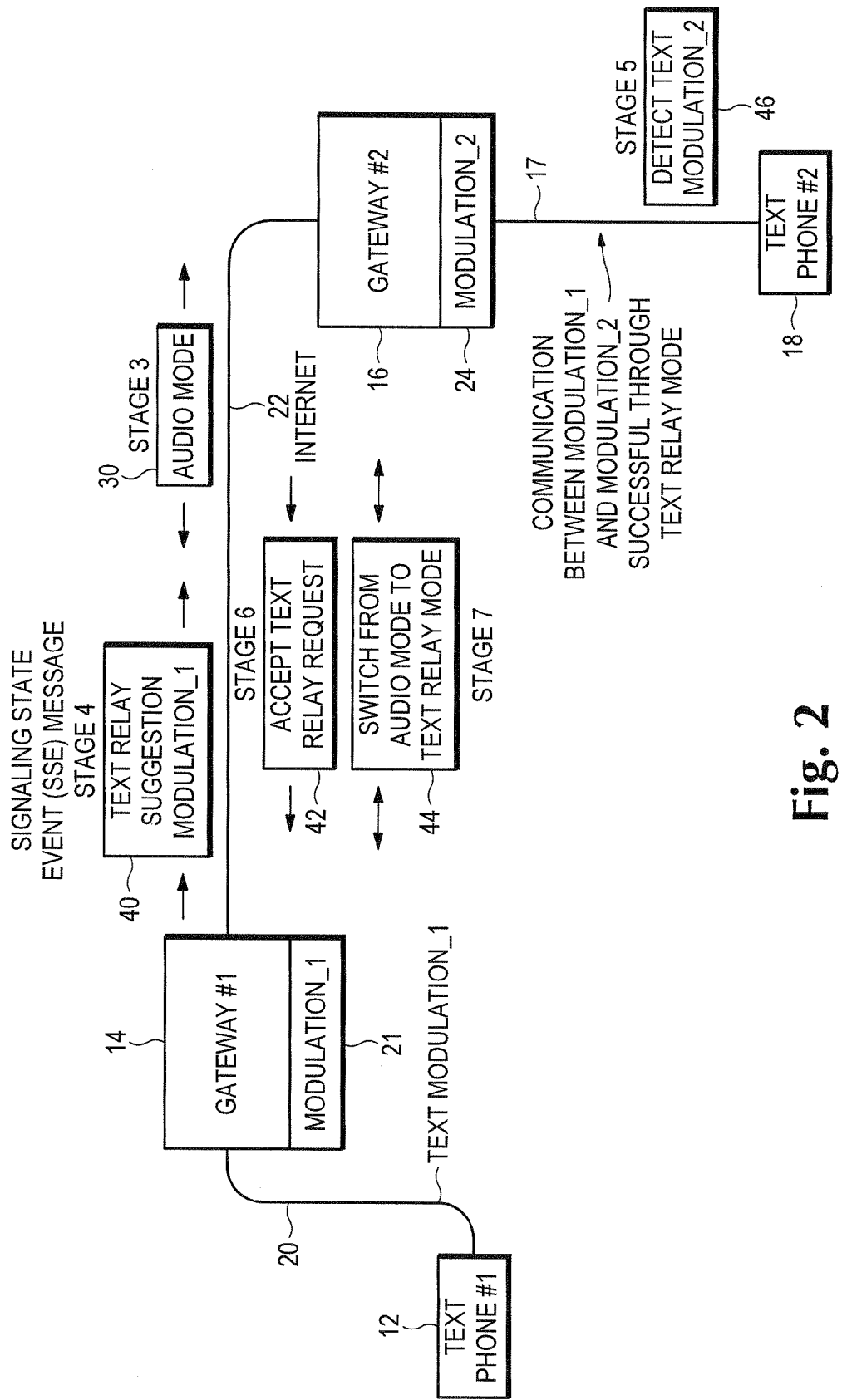
FIG. 2 is a block diagram showing how a text call can be successfully conducted with the disparate text terminals and gateways that support different PSTN text modulations.

Referring to FIG. 2, text relay calls are successfully conducted in gateways that support dissimilar sets of protocols and with text phones that use dissimilar text modulations. In this example, the same modulation exchange 26 and 28 described in FIG. 1 is performed. If the same PSTN text modulations are not supported, the gateways 14 and 16 optionally go into the audio mode 30 as described above in FIG. 1.

Figure 3:
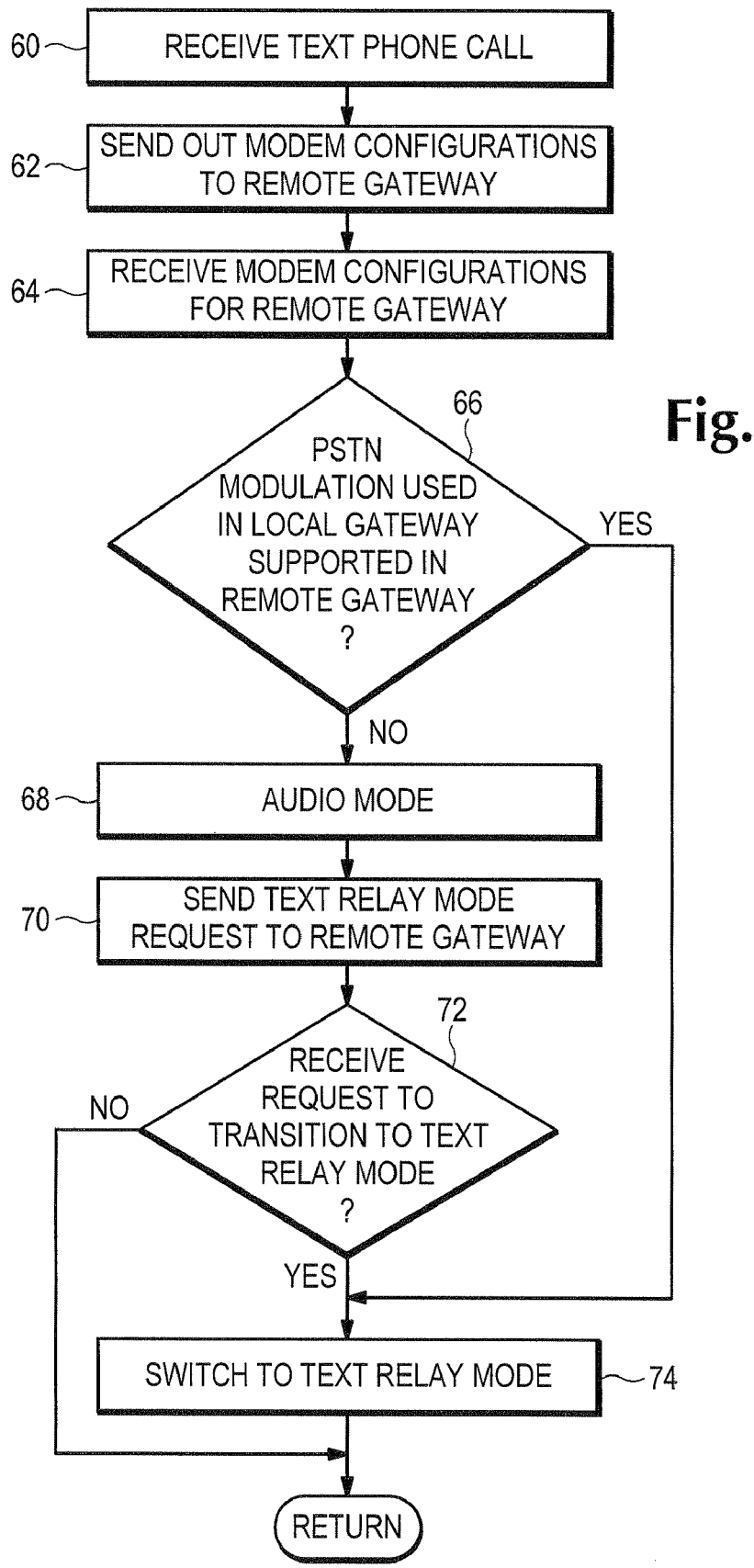
FIG. 3 is a flow diagram showing how a local gateway operates during the text call.

For example, referring to FIGS. 2 and 3, the gateway 14 receives a text terminal call in block 60. The gateway 14 sends out modem configuration information to gateway 16 in block 62. Gateway 14 receives modem configuration information back from gateway 16 in block 64. If the same PSTN text modulation used in gateway 14 is supported by the remote gateway 16 in block 66, the two gateways switch to text relay mode in block 74. If the two gateways 14 and 16 do not support the same PSTN text modulation, then the gateways may use the audio mode in block 68.

The gateway 14 determines that the text phone 12 is using PSTN text modulation_1 and that gateway 14 supports modulation_1. Accordingly, gateway 14 in block 70 sends, as one example, a State Signaling Event (SSE) message 40 to gateway 16 proposing or suggesting a transition to the text relay mode. One example of a text relay mode is described in RFC 2793 which is herein incorporated by reference. Of course other techniques for converting voice signals into text can also be used. The SSE messages are defined in ITU-T recommendation V.150.1 which is herein incorporated by reference.

Optionally the SSE message 40 may include information about the detected modulation_1 used by text phone 12. If the remote gateway 16 does not support modulation_1, or has not yet detected what type of PSTN text modulation is being used by text phone 18, the SSE message 40 is rejected. This forces the two gateways 14 and 16 to either remain or transition into an audio mode 30.

Gateway 16 may later detect that text phone 18 is using PSTN text modulation_2. Gateway 16 has also retained knowledge from SSE message 40 that gateway 14 is also communicating with a PSTN text phone and can operate in the text relay mode. Accordingly, gateway 16 in block 70 sends a SSE message 42 (FIG. 2) back to gateway 14 proposing a transition to text relay mode, preferably with information about the detected modulation_2.

The gateway 14 receives the text relay transition request 42 in block 72 and accepts the request to transition to the text relay mode, in spite of the fact that dissimilar modulations modulation_1 and modulation_2 are in use on the two PSTN networks 20 and 17, respectively. Both gateways transition into text relay mode 44 in block 74 and continue the text call between text phones 12 and 18.

Other schemes can also be used that notify the gateway 14 that the text relay suggestion message 40 has been accepted by gateway 16. For example, the gateway 16 may switch start operating in the text relay mode sometime after receiving text relay suggestion message 40 without ever sending an accept message 42 back to gateway 14. The gateway 14 determines that the text relay suggestion message 40 was accepted when RTP packets are received back from the gateway 16 containing text instead of audio signals.

Thus, dissimilar PSTN text terminals 12 and 18 are interworked by utilizing signals defined in ITU-T Recommendation V.150.1 called "State Signaling Events" (SSEs). Normally, SSEs are used to control a mode shift within the gateways, for example, from voice to modem relay. The SSEs have also been defined for use in signaling a shift from voice to text relay. However, SSEs had never before been considered for use in conducting a mode shift from audio to text relay when the modulation used by the calling user is not supported by the gateway on the remote end. If that condition is not satisfied, then a transition to text relay previously would not happen, as such a transition would result in a communication failure.

Other in-band signals could alternatively be used to indicate the type of device, such as SSE: Voice Band Data (Baudot). That or any other kind of in-band signaling mechanism (e.g., telephony events as described in IETF RFC 2833) could alternatively be used for initiating the switch to the text relay mode.

The end result is that, through messages 40 and 42, gateways 12 and 16 are able to negotiate the use of text relay 44, even though each may be communicating with dissimilar PSTN text terminals 12 and 18 and may not share a common set of modulations. In addition, if one of the gateways 14 or 16 does not support the modulation used by the locally connected text terminal, the text call still might be successfully connected using the conventional audio mode 30.

Figure 4:
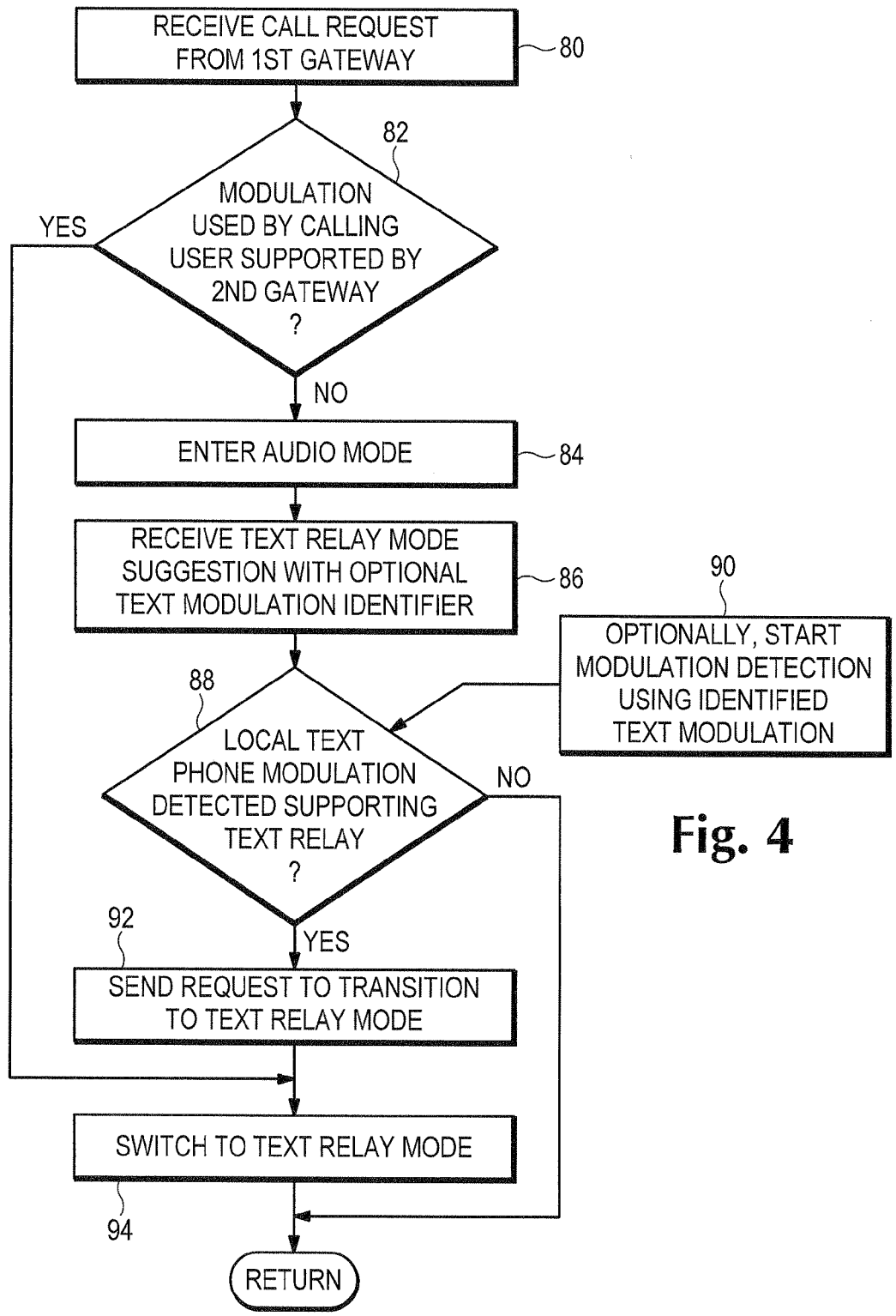
FIG. 4 is a flow diagram showing how a remote gateway operates during the text call.

FIG. 4 shows in more detail the operations performed by the gateway 16. Referring to FIGS. 2 and 4, gateway 16 receives a call request in block 80 from gateway 14 that identifies the PSTN modulation used by gateway 14. In block 82, gateway 16 determines if the PSTN text modulations supported in gateway 14 are all supported in gateway 16. If so, the two gateways 14 and 16 switch to text relay mode in block 94. If not, then the two gateways initially operate in the audio mode 30 in block 84.

In block 86, the gateway 16 receives the SSE message 40 that suggests switching to text relay mode. Optionally, the SSE message 40 may include the identified PSTN text modulation used by text phone 12. Gateway 16 in block 88 then identifies the type of PSTN text modulation used by text phone 18.

If gateway 16 supports the PSTN text modulation used by text phone 18 in block 88, then the gateway 16 in block 92 sends the SSE message 42 to gateway 14 requesting transition to text relay mode. The two gateways 14 and 16 then switch over to the text relay mode 44 in block 94. In the text relay mode as described above, the two gateways 14 and 16 receive PSTN modulation signals, for example, Baudot or V.21, from their respective text phones 12 and 18. The tones in the PSTN modulation are then translated into text characters that are then transmitted in packets to the opposite gateway. The received text characters are then converted into the modulation tones used by the local text phone.

Gateway 16 may optionally in block 90 first try the text modulation identified in SSE message 40 (FIG. 2) when trying to identify the particular PSTN text modulation used by text phone 18. Without having some idea of a possible text terminal type, the gateway 16 would be required to try every configured modem modulation until a match is detected. This trial and error process could take upwards of 60 seconds. Typically, the same text phones are used on opposite ends of a TTY call. For example, users of Baudot text phones typically call other users of Baudot text phones. The gateway 16 can possibly identify the PSTN text modulation used by text phone 18 more quickly by starting with the modulation identified in SSE message 40.

Figure 5:
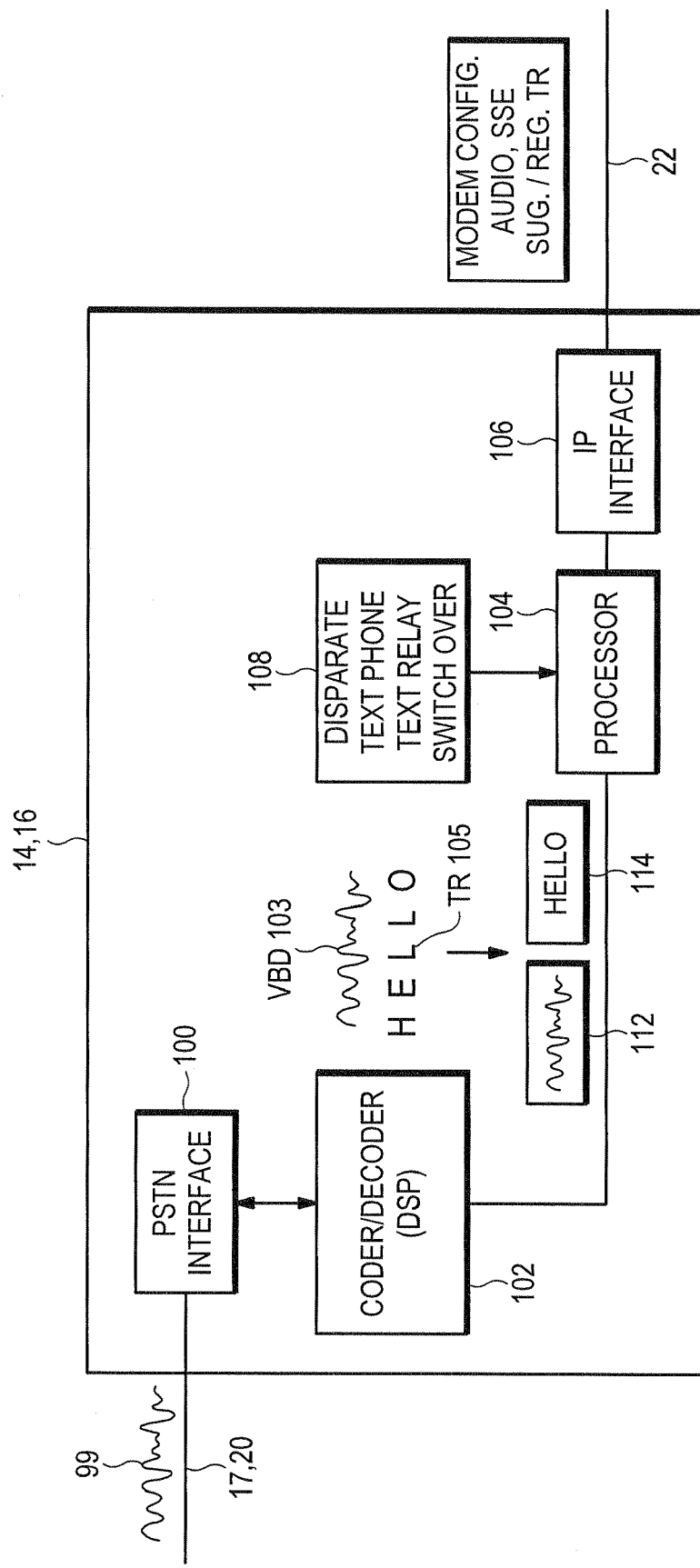
FIG. 5 is a more detailed diagram of the local and remote gateways.

FIG. 5 shows the gateways 14 and 16 in more detail. A PSTN interface 100 receives PSTN text modulated signals 99 over the PSTN network 17 or 20. The PSTN signals 99 are encoded into either audio signaling 103 or text relay data 105 by a coder/decoder (codec). In one embodiment, the codec is implemented in a Digital Signal Processor (DSP) 102. The DSP 102, or a main processor 104, then either converts the audio signals 103 into packets 112 or converts the text relay data 105 into packets 114.

The packets are sent from the processor 104 to an IP interface 106 for transmission over the packet switched network 22. The DSP 102 performs the SSE signaling while coordinating with, or under the direction of, processor 104. The DSP 102 generally handles all media-related functions, while the processor handles state-related functions. However, the division of work between these functional elements can vary in different implementations.

Thus, interworking of dissimilar text phone modulations is provided without the complexity of supporting all modulations and without sacrificing interoperability between like PSTN text phones when certain modulations are not supported. The text relay scheme described above is applicable to any VoIP solution wherein transport of TTY signals over an IP network is required and interworking between dissimilar TTY types is required.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A network processing device, comprising:
a processor in a first gateway sending a text relay suggestion message over a packet switched network to a second remote gateway when operating in an audio mode even when the processor knows that the remote gateway receiving the message does not support a same modulation or when the processor does not know what modulations are supported by the remote gateway, wherein the text relay suggestion message suggests to the second remote gateway to convert modulated voice signals received from an associated endpoint into text and convert text received from the first gateway into the modulated voice signals used by the associated endpoint; and
the processor switching to a text relay mode, in which packets containing a text payload are relayed from the processor over the packet switched network to the second remote gateway, when the text relay suggestion message is accepted by the second remote gateway, wherein the processor determines that the text relay suggestion message is accepted when the text relay suggestion message is initially rejected and then re-proposed by the remote gateway after the remote gateway determines that the text relay mode can be successfully performed.

2. The network processing device according to claim 1 wherein the processor in the first gateway determines that the text relay suggestion message is accepted by receiving an accept message back from the second remote gateway.

3. The network processing device according to claim 1 wherein the processor determines the text relay suggestion message is accepted by detecting that the second remote gateway has transitioned into the text relay mode.

4. The network processing device according to claim 1 wherein the processor identifies in the text relay suggestion message what text modulation is used locally by a text terminal.

5. The network processing device according to claim 1 wherein the processor is configured to use a Signaling State Event (SSE) for sending the text relay suggestion message.

6. A network processing device, comprising:
a processor configured to support a text call over a packet switched network in an audio mode or in a text relay mode;
the processor configured to determine if a modulation used by a remote device is locally supported by the processor, operate in the text relay mode if the modulation used by the remote device is locally supported by the processor, and operate in the audio mode if the modulation used by the remote device is not locally supported by the processor;
the processor configured when operating in the audio mode to receive a text relay mode request message over the packet switched network indicating the remote device can operate in the text relay mode, the processor configured to receive the text relay mode request from the remote device even when the remote device either knows the processor does not support a same modulation or when the remote device does not know what modulations are supported by the processor;
and the processor further configured to switch from the audio mode to the text relay mode if the text call is directed to a text terminal using a text modulation scheme locally supported by the processor.

7. The network processing device according to claim 6 wherein the text relay mode request message identifies a PSTN text modulation used by a text terminal at the remote device.

8. The network processing device according to claim 6 wherein the processor initially rejects the text relay mode request message and then re-proposes a transition to the text relay mode to the remote device after determining that the text relay mode can be successfully performed with the text terminal.

9. The network processing device according to claim 6 wherein the processor indicates acceptance of the text relay mode request messages to the remote device either by sending an acceptance message or by switching to the text relay mode.

10. A network processing device, comprising:
a processor configured to support a text call over a packet switched network in an audio mode or a text relay mode;
the processor configured to determine if a modulation used by a remote device is locally supported by the processor, operate in the text relay mode if the modulation used by the remote device is locally supported by the processor, and operate in the audio mode if the modulation used by the remote device is not locally supported by the processor;
the processor when operating in the audio mode receiving a text relay mode request message sent over the packet switched network indicating the remote device can operate in the text relay mode even when the remote device either knows that the processor does not support the same modulation or when the remote device does not know what modulations are supported by the processor; and
the processor initially rejecting the text relay mode request message and then re-proposing a transition to the text relay mode to the remote device when the text call is directed to a text terminal using a text modulation scheme locally supported by the processor.

11. The network processing device according to claim 10 wherein the text relay mode request message identifies a remote PSTN text modulation scheme and the processor tries the identified PSTN text modulation scheme first when determining what text modulation scheme is being used for the text terminal.

12. The network processing device according to claim 10 including:
a Public Switched Telephone Network (PSTN) interface for communicating with the text terminal using PSTN text modulation signals, and
a signal processor converting the PSTN text modulation signals into Internet Protocol (IP) packets when operating in the audio mode and converting the PSTN text modulation signals into text and converting the text into IP packets when operating in the text relay mode.

13. A method for using an apparatus for conducting text calls in a packet switched network, comprising:
conducting a communication scheme wherein:
a first gateway operates in a text relay mode if a modulation used by a second remote gateway is locally supported by the first gateway and operates in an audio mode if the modulation used by the second remote gateway is not locally supported by the first gateway;
the first gateway sends a text relay suggestion message to the second remote gateway when operating in the audio mode, wherein the text relay suggestion message suggests to the second remote gateway to switch to the text relay mode;
the first gateway switches to the text relay mode when the text relay suggestion message is accepted by the second remote gateway; and
the communication scheme allows the first and second gateways that do not necessarily support a common set of Public Switched Telephone Network (PSTN) text terminal (TTY) modulations and which are communicating with dissimilar PSTN text terminal devices to negotiate a transition to the text relay mode.

14. The method according to claim 13 wherein the communication scheme includes the first gateway sending the text relay suggestion message when operating in the audio mode to the second remote gateway even when the first gateway knows the second gateway does not support a same modulation or when the first gateway does not know what modulations are supported by the second gateway, and the first gateway then switches to the text relay mode when the first gateway determines the second gateway has accepted the text relay suggestion message.

15. A non-transitory computer storage medium containing instructions for conducting a communication scheme, the instructions when executed by a computing device, comprising:
operating a first gateway in a text relay mode if a modulation used by a second remote gateway is locally supported by the first gateway and operating the first gateway in an audio mode if the modulation used by the second remote gateway is not locally supported by the first gateway;
sending a text relay suggestion message from the first gateway to the second remote gateway when operating in the audio mode, wherein the text relay suggestion message suggests to the second remote gateway to switch to the text relay mode; and
switching the first gateway from the audio mode to the text relay mode when the text relay suggestion message is accepted by the second remote gateway, wherein the communication scheme allows the first and second gateways when communicating with dissimilar PSTN text terminal devices to negotiate a transition to text relay mode.

16. A method for conducting text calls in a packet switched network, comprising:
determining if a modulation used by a remote modem is locally supported;
operating in a text relay mode if the modulation used by the remote modem is locally supported;
operating in an audio mode if the modulation used by the remote modem is not locally supported;
sending a text relay suggestion message over a packet switched network to the remote modem when operating in the audio mode even when the remote modem receiving the message does not support the same modulation or when modulations supported by the remote modem are unknown, wherein the text relay suggestion message suggests to the remote modem to convert modulated voice signals received from an associated endpoint into text and convert text received from a remote gateway into the modulated voice signals used by the associated endpoint; and
switching to the text relay mode, in which packets containing a text payload are relayed over the packet switched network to the remote modem, when the text relay suggestion message is accepted by the remote modem.

17. The method according to claim 16 including determining that the text relay suggestion message is accepted by receiving an accept message back from the remote modem.

18. The method according to claim 16 including determining the text relay suggestion message is accepted by detecting that the remote modem has transitioned into the text relay mode.

19. The method according to claim 16 including determining that the text relay suggestion message is accepted when the text relay suggestion message is initially rejected and then re-proposed by the remote modem.

20. A system for conducting text calls in a packet switched network, comprising:
an apparatus determining if a modulation used by a remote device is locally supported, operating in a text relay mode if the modulation used by the remote device is locally supported, and operating in an audio mode if the modulation used by the remote device is not locally supported;
the apparatus sending a text relay suggestion message over a packet switched network to the remote device when operating in an audio mode even when the remote device does not support the same modulation or when modulations supported by the remote device are unknown, wherein the text relay suggestion message suggests to the remote device to convert modulated voice signals received from an associated endpoint into text and convert text received from a remote gateway into the modulated voice signals used by the associated endpoint; and
the apparatus switching from the audio mode to the text relay mode when the text relay suggestion message is accepted by the remote device and remaining in the audio mode when the text relay suggestion message is not accepted.

21. The system according to claim 20 including the apparatus determining that the text relay suggestion message is accepted by receiving an accept message back from the remote device.

22. The system according to claim 20 including the apparatus determining the text relay suggestion message is accepted by detecting that the remote device has transitioned into the text relay mode.

23. The system according to claim 20 including the apparatus determining that the text relay suggestion message is accepted when the text relay suggestion message is initially rejected and then re-proposed by the remote device.

24. A method for conducting text calls in a packet switched network, comprising:
supporting a text call over a packet switched network in an audio mode or in a text relay mode;
determining if a modulation used by a remote network device is locally supported, operating in a text relay mode if the modulation used by the remote network device is locally supported, and operating in an audio mode if the modulation used by the remote network device is not locally supported;
receiving a text relay mode request message sent over the packet switched network when operating in the audio mode indicating the remote network device can operate in the text relay mode and receiving the text relay mode request from the remote network device even when a local receiving device either does not support a same modulation or when the modulations supported by the local receiving device are unknown to the remote network device; and
switching from the audio mode to the text relay mode if the text call is directed to a text terminal using a text modulation scheme locally supported by the local receiving device.

25. The method according to claim 24 including identifying a remote PSTN text modulation scheme in the text relay mode request message that is used when trying to determine what text modulation scheme to use for the text terminal.

26. The method according to claim 24 including initially rejecting the text relay mode request message and then re-proposing a transition to the text relay mode to the remote device after determining that the text relay mode can be successfully performed with the text terminal.

27. The method according to claim 24 including indicating acceptance of the text relay mode request message either by sending an acceptance message or by switching to the text relay mode.

28. A system for conducting text calls in a packet switched network, comprising:
an apparatus supporting a text call over a packet switched network in an audio mode or in a text relay mode;
the apparatus determining if a modulation used by a remote network device is locally supported, operating in a text relay mode if the modulation used by the remote network device is locally supported, and operating in an audio mode if the modulation used by the remote network device is not locally supported;
the apparatus receiving a text relay mode request message sent over the packet switched network when operating in the audio mode indicating the remote network device can operate in the text relay mode and receiving the text relay mode request from the remote network device even when a local receiving device either does not support a same modulation or when the modulations supported by the local receiving device are unknown to the remote network device; and
the apparatus switching from the audio mode to the text relay mode if the text call is directed to a text terminal using a text modulation scheme locally supported by the local receiving device.

29. The system according to claim 28 including the apparatus identifying a remote PSTN text modulation scheme in the text relay mode request message that is used when trying to determine what text modulation scheme to use for the text terminal.

30. The system according to claim 28 including the apparatus initially rejecting the text relay mode request message and then re-proposing a transition to the text relay mode to the remote device after determining that the text relay mode can be successfully performed with the text terminal.

31. The system according to claim 28 including the apparatus indicating acceptance of the text relay mode request messages either by sending an acceptance message or by switching to the text relay mode.

* * * * *